United States Patent [19]

Ikegami et al.

[11] 4,103,197
[45] Jul. 25, 1978

[54] CYLINDRICAL CORE WITH TOROIDAL WINDINGS AT ANGULARLY SPACED LOCATIONS ON THE CORE

[75] Inventors: Keisuke Ikegami, Tokyo; Susumu Hoshimi, Yokohama, both of Japan

[73] Assignee: Sony Corporation, Tokyo, Japan

[21] Appl. No.: 666,672

[22] Filed: Mar. 15, 1976

[30] Foreign Application Priority Data

Mar. 19, 1975 [JP] Japan .............................. 50-37043[U]

[51] Int. Cl.² .............................................. H02K 1/22
[52] U.S. Cl. ....................................... 310/267; 310/42
[58] Field of Search ................ 310/267, 261, 42, 216, 310/218, 254, 258, 259

[56] References Cited

U.S. PATENT DOCUMENTS

| | | | |
|---|---|---|---|
| 427,405 | 5/1890 | Deprez | 310/267 |
| 469,080 | 2/1892 | Deprez | 310/267 |
| 483,700 | 10/1892 | Thomson | 310/267 |

*Primary Examiner*—Donovan F. Duggan
*Attorney, Agent, or Firm*—Lewis H. Eslinger; Alvin Sinderbrand

[57] ABSTRACT

A cylindrical core with toroidal windings at angularly spaced locations on the core, for example, as in the stator of a brushless, slotless DC motor for a record player or tape recorder, is formed of a plurality of annular core elements each having an axial slot and initially being axially superposed with the respective slots in axial alignment. The windings are conveniently formed individually on respective bobbins which are dimensioned to pass through the axially aligned slots for installation on the superposed core elements, whereupon, the latter are preferably turned relative to each other for angularly offsetting the respective slots and thereby minimizing the turbulence of magnetic flux that can result therefrom.

4 Claims, 8 Drawing Figures

CYLINDRICAL CORE WITH TOROIDAL WINDINGS AT ANGULARLY SPACED LOCATIONS ON THE CORE

BACKGROUND OF THE INVENTION

1. Field of the Invention

This invention relates generally to the provision of toroidal conductive windings on a cylindrical magnetic core, for example, as in the stator of an electric motor or the like.

2. Description of the Prior Art

Many electrical devices include a cylindrical magnetic core having a plurality of toroidal conductive windings extending around the core at angularly spaced locations on the core. For example, in the brushless, slotless, small-sized DC motors used for record players, tape recorders, and the like, the stator of the motor comprises a cylindrical stator core of magnetic material on which three toroidal conductive windings are mounted at uniformly angularly spaced apart locations. A special winding machine is required for providing the toroidal windings on the cylindrical core. Apart from the fact that the required special winding machine is complex and costly, its operating efficiency is very low, that is, it produces the wound stators at a slow rate.

OBJECTS AND SUMMARY OF THE INVENTION

Accordingly, it is an object of this invention to provide an improved cylindrical core wih toroidal windings at angularly spaced locations on the core, as in the stator of a brushless, slotless DC motor, and which permits such windings to be quickly and efficiently produced.

Another object is to provide a cylindrical core with toroidal windings thereon, as aforesaid, and which may be employed as the stator of brushless, slotless DC motor or the like without causing appreciable magnetic flux turbulence.

In accordance with an aspect of this invention, a cylindrical magnetic core is formed of at least one annular core element having an axial slot, and the toroidal windings are wound apart from the core on respective bobbins which are dimensioned to pass through the slot for the core element for installation on the core at the respective angularly spaced locations on the latter. In a preferred embodiment of the invention, the cylindrical core is formed of a plurality of the core elements each having an axial slot and being axially superposed on each other with the axial slots in alignment to permit the bobbins to pass therethrough for installation of the respective windings on the resulting core. After such installation of the windings on the core, the several core elements of the latter are turned relative to each other for angularly offsetting their respective slots and thereby minimizing the magnetic flux turbulence that can result therefrom.

The above, and other objects, features and advantages of the invention, will be apparent from the following detailed description of an illustrative embodiment which is to be read in connection with the accompanying drawings.

DESCRIPTION OF THE PREFERRED EMBODIMENTS

Figure 1:
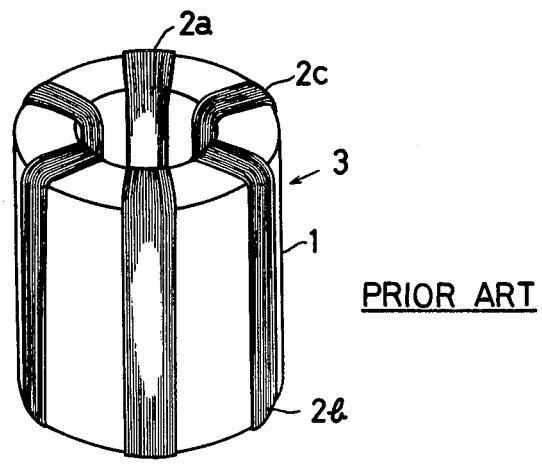
FIG. 1 is a perspective view of the stator of a conventional DC electric motor.

Referring first to FIG. 1, it will be seen that the stator 3 of a small-sized brushless, slotless DC motor, for example, as is commonly used to drive a record player or tape recorder, conventionally includes a cylindrical stator core 1 of magnetic material on which three toroidal windings 2a, 2b and 2c are wound at regular angularly spaced intervals around the core 1. The forming of the windings 2a, 2b and 2c on the cylindrical core 1 requires the use of a special winding machine which, as previously mentioned, is costly and complex and produces the desired windings at a slow rate.

Figure 2:
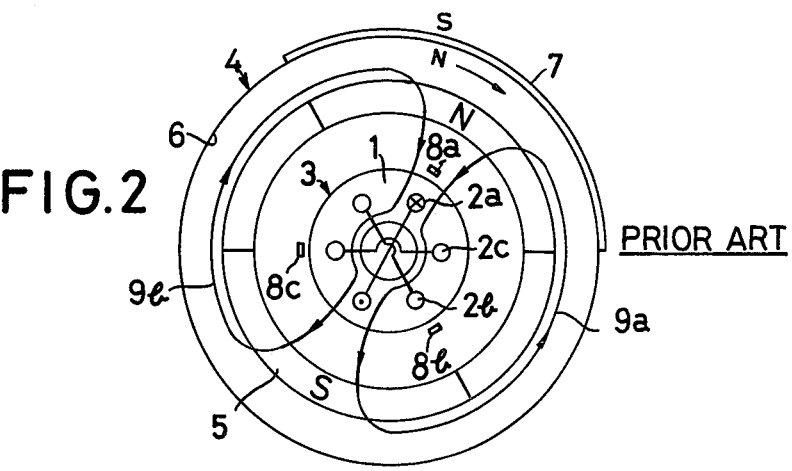
FIG. 2 is a schematic cross-sectional view of the conventional DC electric motor.

As is shown schematically on FIG. 2, the stator 3 of FIG. 1 is located concentrically within a cylindrical rotor 4 which includes a cylindrical magnet 5 which provides north and south poles N and S over diametrically opposed 120° extents of magnet 5. A cylindrical yoke 6 is fixedly positioned about magnet 5, and an arcuate detection magnet 7 having an angular extent of about 120°–130° is fixed on the outer surface of yoke 6 so as to be substantially in radial alignment with the north pole portion of magnet 5. The arcuate magnet 7 is formed to provide a south pole S at its outer surface and a north pole N at its inner surface against yoke 6. The known motor shown on FIG. 2 further includes three position-sensing means 8a, 8b and 8c at regular angular intervals of 120° in the annular space between stator 3 and rotor 4. Each of the position-sensing means 8a, 8b and 8c may, as is known, include a respective coil wound on a saturable magnetic core, for example, of soft ferrite, and the coils of position-sensing means 8a, 8b and 8c are connected in parallel with each other and have applied thereto an AC voltage, for example, with a frequency of 80 KHz.

When the rotor 4 is rotating in the direction of the arrow on FIG. 2 and attains the position shown on that view of the drawings, that is, the position in which detection magnet 7 on rotor 4 is angularly aligned with position-sensing means 8a, the core of position-sensing means 8a is saturated with magnetic flux so that the inductance of the associated coil becomes nearly zero. As a result of the foregoing, the voltage drop across the coil of position-sensing means 8a becomes nearly zero and, in response thereto, a switching element (not shown) connected to position-sensing means 8a is turned on to supply currents to winding 2a of stator 3 through such switching element. With rotor 4 in the position shown on FIG. 2, the cores of position-sensing means 8b and 8c are not saturated with magnetic flux and, therefore, their respective coils have predetermined inductance values which cause switching elements (not shown) connected to position-sensing means 8b and 8c to be turned off so that currents are not supplied to the associated windings 2b and 2c of stator 3.

With rotor 4 in the position shown on FIG. 2, the current flows through the windings 2a in the directions indicated by ⊙ and ⊗. Further, as a result of magnet 5, magnetic fluxes flow in two magnetic flux circuits 9a and 9b. A force F is generated by the interaction of such magnetic fluxes with the current flowing through the winding 2a. The force F is represented by the formula: $F = 2B \cdot L \cdot IN$; in which L is the intensity of the current, N is the number of turns of the windings 2a, 2b or 2c, and B is the density of the magnetic flux. The force F produces a torque for rotating the rotor 4 in the direction of the arrow on FIG. 2. In the course of such rotation, the cores of position-sensing means 8a, 8b and 8c are saturated with magnetic flux in order, and therefore the windings 2a, 2b and 2c of the stator are energized in order to generate the torque for continuously rotating the rotor 4.

Figure 3:
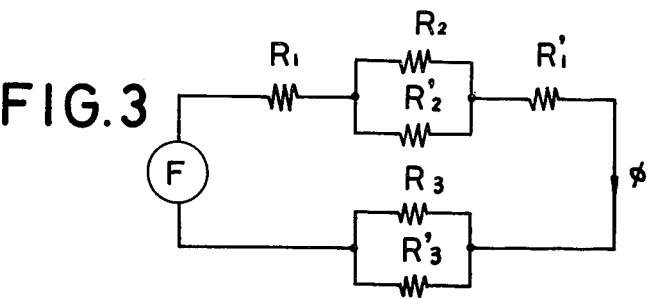
FIG. 3 is a diagram showing the electrical equivalent of the magnetic circuit of the DC electric motor of FIG. 2.

FIG. 3 shows a circuit diagram equivalent to the magnetic flux circuits 9a and 9b, and in which:

F is the magnetomotive force of the magnet 5;
$\phi$ is the magnetic flux;
$R_1$ is the magnetic resistance between the N-pole of magnet 5 and stator 3;
$R_1'$ is the magnetic resistance between the S-pole of magnet 5 and stator 3;
$R_2$ is the magnetic resistance of stator 3 in the magnetic flux circuit 9a;
$R_2'$ is the magnetic resistance of the stator 3 in the other magnetic flux circuit 9b;
$R_3$ is the magnetic resistance of the yoke 6 in the magnetic flux circuit 9a; and
$R_3'$ is the magnetic resistance of the yoke 6 in the other magnetic flux circuit 9b.

The above resistances $R_1, R_1', R_2, R_2', R_3$ and $R_3'$ are represented by the following formulas:

$R_1 = R_1' = g/\mu_0 S_0,$ $R_2 = R_2' = l_1/\mu_1 S_1$ and $R_3 = R_3' = l_2/\mu_2 S_2$ in which:

g is the gap between the rotor 4 and the stator 3;
$S_0$ is the area of the N-pole or the S-pole of the magnet 5 which faces the stator 3 and through which magnetic flux flows;
$S_1$ is the cross-sectional area of stator 3 in the magnetic flux circuit 9a;
$S_2$ is the cross-sectional area of the yoke 6 in magnetic flux circuits 9a and 9b;
$l_1$ is the mean length of the magnetic path in stator 3;
$l_2$ is the mean length of the magnetic path in yoke 6;
$\mu_0$ is the magnetic permeability of air;
$\mu_1$ is the magnetic permeability of stator core 1; and
$\mu_2$ is the magnetic permeability of yoke 6.

In the above formulas, normally $\mu_1 >> \mu_0$ and $\mu_2 >> \mu_0$, and, therefore, $R_1 = R_1' >> R_2 = R_2'$. Accordingly, neither $R_2$ nor $R_2'$ has much effect on the torque characteristic of the rotor 4. Therefore, a part of the cylindrical stator core 1 can be cut away without appreciably affecting the torque characteristic of the motor, and such fact forms the basis for the present invention.

Generally, in accordance with this invention, the assembly of a cylindrical core of magnetic material with a plurality of conductive toroidal windings extending about the core at angularly spaced locations on the latter is produced by separately forming the individual windings on respective bobbins, as in a conventional winding machine which efficiently performs that function, and by forming the cylindrical core with an axial slot or slit that is sufficiently wide to permit the bobbins with the windings thereon to be successively passed through such slot and onto the core, whereupon the bobbins are displaced circumferentially about the core to the required positions at which they are fixedly located.

Figure 4:
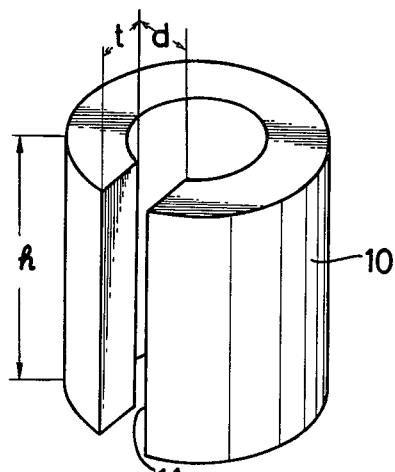
FIG. 4 is a perspective view of a stator core according to one embodiment of this invention.
Figure 5:
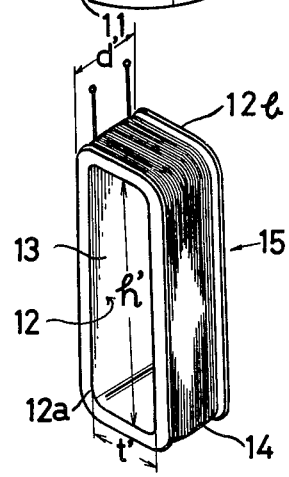
FIG. 5 is a perspective view of a winding unit or assembly to be mounted on the stator core of FIG. 4.
Figure 6:
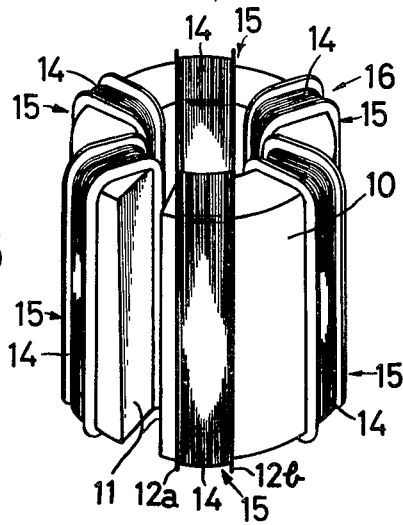
FIG. 6 is a perspective view of a stator made up of the stator core of FIG. 4 and a number of the winding units of FIG. 5.

Referring now to FIGS. 4–6, in which the invention is shown applied to the stator 16 of an electric motor of the type described above with reference to FIGS. 1 and 2, it will be seen that such stator 16 includes a cylindrical core 10 and six winding units 15 which are disposed at equally angularly spaced apart locations about the core (FIG. 6).

In accordance with this invention, the cylindrical core 10, which is shown to be formed of a single element on FIG. 4, has an axial slot 11 which extends radially through core element 10 along the entire axial length h of the latter.

The winding units 15 are formed independently of the core element 10. As shown particularly on FIG. 5, each of the winding units 15 includes a bobbin 12 formed of a synthetic resin and defining a substantially rectangular passage 13 extending therethrough which has a major dimension h' approximately equal to the axial length h of core element 10 and a minor dimension t' approximately equal to the thickness t (FIG. 4) of core element 10 so that the core element can extend through passage 13. The bobbin 12 is further shown to have flanges 12a and 12b directed outwardly therefrom at the opposite open ends of passage 13. Each winding unit 15 is further shown to include a winding 14 comprised of a predetermined number of turns of conductive wire wound on the respective bobbin 12 between flanges 12a and 12b, as in a conventional winding machine.

The width d of the slot 11 in core element 10 is selected to permit the passage therethrough, one at a time, of the bobbins 12 with the respective windings 14 thereon, for example, the width d of slot 11 may be approximately equal to the width d' of each bobbin 12. Thus, after the requisite number of winding units 15 are formed apart from core element 10, such winding units 15 are passed, one at a time, through slot 11 and then slidably displaced along core element 10 to the required location on the latter until all of winding units 15 are disposed at equally angularly spaced apart locations on the core element. Finally, the bobbins 12 of winding units 15 are fixed, as by cement or the like, at the respective locations on core element 10.

Of course, in the case of the stator 16 intended for an electric motor of the type described above with reference to FIGS. 1 and 2 and which has three-phase windings 2a, 2b and 2c, there are two winding units 15 for each phase winding, that is, a total of six winding units 15 which are angularly spaced from each other by 60° when finally located on core element 10. However, stators according to this invention may be provided with any other number n of phase windings, in which case the stator is provided with 2n winding units 15 which are angularly spaced apart on the core element 10 by 360°/2n.

In any event, as has been described above, the slot 11 in core element 10 which permits the convenient forming of the windings 14 apart from the core has little effect on the rotation or torque characteristics of an electric motor provided with the resulting stator 16.

Figure 7:
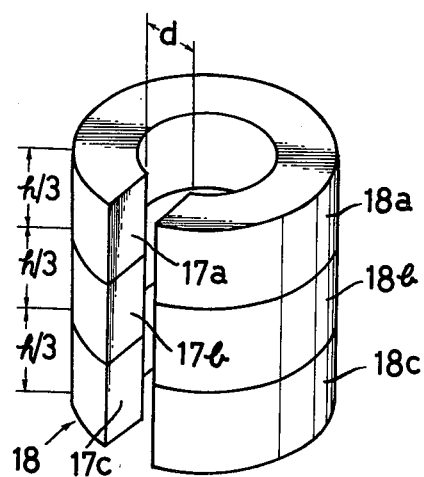
FIG. 7 is a perspective view of a stator core according to another embodiment of this invention.
Figure 8:
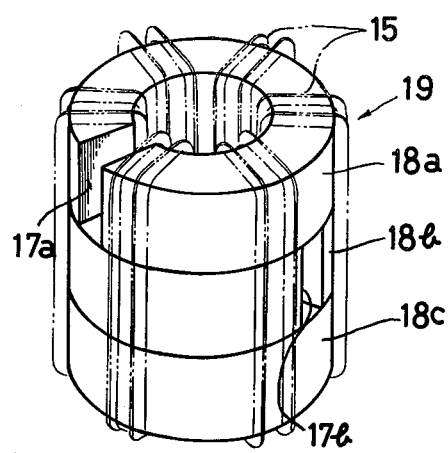
FIG. 8 is a perspective view of a stator made up of the stator core of FIG. 7 and a number of the winding units of FIG. 5.

Referring now to FIGS. 7 and 8, it will be seen that, in a stator 19 according to another embodiment of this invention which is otherwise similar to the previously described stator 16, the cylindrical stator core 18 is comprised of three similar annular stator core elements 18a, 18b and 18c each having an axial dimension h/3 that is one-third the desired axial length of the core 18, and which are axially superposed. The three annular stator core elements 18a, 18b and 18c have axial slots 17a, 17b and 17c which extend radially through the respective core elements 18a, 18b and 18c along the entire axial lengths h/3 of the latter. The winding units 15 (FIG. 8) are formed apart from core 18 and then installed on the latter, as described previously with reference to the embodiment of FIGS. 4–6. During such installation of the winding units on core 18, the core elements 18a, 18b and 18c are arranged with their slots 17a, 17b and 17c in axial alignment with each other, as shown on FIG. 7, so as to present a continuous slot along the entire axial length of core 18 through which the winding units 15 can be successively passed for movement onto core 18. After the winding units 15 have been installed on stator core 18, the core elements 18a, 18b and 18c are turned relative to each other so as to angularly offset the respective slots 17a, 17b and 17c relative to each other by 120°, as shown on FIG. 8. With the core elements 18a, 18b and 18c thus disposed relative to each other and the winding units 15 at equally angularly spaced apart locations on core 18, the several core elements are suitably secured to each other and the winding units 15 are similarly suitably secured at their respective locations on the resulting core 18 so as to provide the finished stator 19 of FIG. 8.

In the stator 19 of FIG. 8, the magnetic flux turbulence resulting from the offset or equally angularly spaced apart slots 17a, 17b and 17c is reduced to about one-third of the magnetic flux turbulence that results from the slot 11 in the single core element 10 of stator 16 on FIG. 6.

If desired, the magnetic flux turbulence can be further reduced in either the embodiment of FIGS. 4–6 or the embodiment of FIGS. 7 and 8 by filling the slot 11 in stator core element 10 or the slots 17a, 17b and 17c in stator core elements 18a, 18b and 18c with a magnetic material which is preferably the same as the material forming the stator core element or elements, and which is applied to the slot or slots after the winding units have been installed through the slot or slots onto the stator core.

Although the stator core 18 of FIG. 7 is shown to be composed of three stator core elements, as aforesaid, any number of stator core elements greater than one may be employed with the reduction of the magnetic flux turbulence due to the slots in such stator core elements being generally dependent upon the number of core elements that are used.

Although the present invention has been described above and illustrated as being applied to the stator of an electric motor of the type described with reference to FIGS. 1 and 2, it will be apparent that the invention can be similarly applied to the rotor of an electric motor or to any other electrical device, such as, for example, an ammeter, in which a cylindrical core is provided with toroidal windings thereon at angularly spaced locations, so that, by providing the core with an axial slot, the windings or coils can be formed independently of the core and then installed on the latter through the slot therein.

Having described specific embodiments of this invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An electrical device having a cylindrical magnetic core of magnetic material, said core being provided with an axial slot extending radially therethrough to provide said core with a corresponding slot extending along the entire axial length of the core for receiving pre-wound toroidal coils through said slot; a plurality of pre-wound toroidal coils being dimensioned to pass through said slot of said core and defining a passage through which said core passes, said pre-wound cores extending about said core at angularly spaced locations thereon; and in which said core includes a plurality of annular core elements axially superposed on each other to form said core and each having an axial slot so that, with said core elements arranged axially to align their respective slots, the latter define said corresponding slot of the core along the entire axial length of the core through which said pre-wound toroidal coils can pass for installation on said core; said core elements being rotatable with respect to each other so as to be arranged their respective slots circumferentially displaced from each other with said pre-wound toroidal coils extending about said elements for reducing the magnetic flux turbulence that may occur as a result of said axially aligned slots.

2. An electrical device according to claim 1; further comprising magnetic material similar to that of each said core element for filling said slots of the latter after said core elements are arranged with their respective slots circumferentially spaced apart from each other.

3. An electric motor comprising a rotor, a cylindrical stator core of magnetic material arranged concentrically with said rotor, and a plurality of pre-wound toroidal coils installed on the core at angularly spaced intervals; said stator core including a plurality of axially superposed annular core elements, each having an axial slot extending radially therethrough so that said slots of said core elements can be initially axially aligned with each other to define an axial slot extending radially through said stator core for receiving said pre-wound toroidal coils through said slot for disposition at angularly spaced intervals on said core; said core elements bring rotatable relative to each other so as to be arranged with their respective slots circumferentially displaced from each other, thereby reducing the magnetic flux turbulence that may occur as a result of said axial slot.

4. An electrical motor according to claim 3; further comprising magnetic material similar to that of each said core element, for filling said slots of the latter after said core elements are arranged with their respective slots circumferentially spaced apart from each other.

* * * * *